United States Patent Office
3,594,187
Patented July 20, 1971

3,594,187
POTATO PRODUCTS HAVING IMPROVED FLAVOR
Alexander L. Liepa, Cincinnati, Ohio, assignor to The Procter & Gamble Company, Cincinnati, Ohio
No Drawing. Filed Mar. 27, 1968, Ser. No. 716,296
Int. Cl. A23l 1/12; A23b 7/02
U.S. Cl. 99—100                    8 Claims

ABSTRACT OF THE DISCLOSURE

A process for improving the flavor of cooked potato products prepared from dehydrated potatoes and water. A flavor-enhancing agent derived from a plant of the Cruciferae family is added to the potatoes prior to cooking to provide an enhanced natural potato flavor in the cooked product.

BACKGROUND OF THE INVENTION

The field of this invention is edible potato products. The invention itself relates to improving the flavor of potato products prepared from dehydrated potatoes, e.g., a dough of dehydrated potatoes and water which can be cooked to provide a tasty, appealing potato product.

The preparation of potato products from a dough based either on raw potato pieces or on dehydrated potatoes is well known. French fried potatoes and potato chips are among the potato products which have been prepared from such doughs. The advantages of preparing such products from a dough rather than from sliced whole potatoes include homogeneity or uniformity in the end products and the ability to more closely control the separate steps involved in the preparation of the product. When products of this type are prepared from doughs based on dehydrated potatoes and water, however, it has been found that the flavor of the resulting fried product, though acceptable, is partially lacking in the characteristic fried potato flavor of corresponding products prepared from raw potatoes. For example, potato chips prepared by frying thin slices of raw potatoes generally have a more intense potato chip flavor than potato chips made by frying dough pieces which have been prepared by admixing dehydrated potatoes and water.

Similarly, the preparation of mashed potatoes by reconstituting dehydrated cooked potatoes is well known. However, mashed potatoes so prepared do not closely resemble freshly mashed cooked potatoes in flavor and thus the use of dehydrated cooked potatoes for such purposes has not met with the hoped-for level of consumer acceptance.

The reason for these flavor differences between potato products prepared from fresh, raw potatoes and those prepared from dehydrated potatoes appears to be the degradative effect of the dehydration process on the potato cells. Although the precise nature of this degradation is not known, it is theorized that a number of flavor precursors are either destroyed or significantly reduced in availability. Close control over the dehydration process can provide some marginal improvement in ultimate product flavor, but these changes necessarily increase the cost of the dehydrated potatoes by a significant degree and still do not provide products having the flavor of products prepared from fresh, raw potatoes.

Thus, the problem to which the present invention is addressed is the improvement of the flavor of potato products prepared from dehydrated potatoes and water to more closely resemble that of the corresponding products prepared from fresh, raw or cooked whole potatoes, as the case may be.

SUMMARY OF THE INVENTION

Briefly stated, in accordance with the present invention, a product and process are provided whereby the flavor of potato products prepared from dehydrated potatoes is improved by adding to the potatoes from about 0.05% to about 2.0% by weight of the potatoes a flavor-enhancing agent selected from plants of the Cruciferae family. Products so prepared have a significantly improved flavor as compared with corresponding products prepared without the added flavor-enhancing agent.

DESCRIPTION OF THE PREFERRED

The flavor improvement effect of this invention is broadly applicable to potato products made from dehydrated potatoes. These products are generally prepared from a mixture of dehydrated potatoes and water, e.g., a mixture that contains 10% to 85% dehydrated potatoes and 15% to 90% water. The flavor-enhancing agent can be added prior to or after the addition of water to the potatoes. Mixtures of dehydrated potatoes and water are often cooked, e.g., by heating, baking or frying before ultimate consumption, and preferred flavor effects are obtained when the flavor-enhancing agent has been added prior to a cooking step. Particularly preferred results are obtained in products where the cooking step comprises frying.

A wide variety of potato products having improved flavor obtained by the addition of a flavor-enhancing agent selected from plants of the Cruciferae family can be made in accordance with this invention by cooking a mixture of dehydrated potatoes and water. Examples of such products are: Mashed potatoes prepared by adding water or milk to dehydrated potatoes to form a mixture of the desired consistency, stirring or whipping the mixture and then heating; potato soup prepared by cooking a liquid mixture of dehydrated potatoes and water; and french fries, pancakes, or potato chips prepared by baking or frying a dough based on dehydrated potatoes and water.

Preferred products which are flavor improved by the process of this invention are fried potato products prepared from a dough based on dehydrated potatoes and water, i.e., a dough prepared by partially rehydrating dehydrated potatoes. The requirements for preparing such a dough which is suitable for frying are known in the art. Often such doughs utilize a binding agent for cohesiveness. See, for example, British Patent 608,996 which discloses doughs of dehydrated potatoes, water and a binding agent such as pectin, gelatin, gum arabic or the like. U.S. Pat. 3,085,020 discloses doughs of dehydrated cooked mashed potatoes, water, and methyl cellulose. Thus, the flavor improvement process of the present invention can be utilized with various mixtures of dehydrated potatoes and water, and is preferably applied to doughs based on dehydrated potatoes and water.

Preferred doughs utilized in the present invention are prepared from dehydrated potatoes which have a portion of their cells ruptured and thus contain free starch as indicated by a preferred iodine index of from about 0.01 to about 6. A highly preferred iodine index is about 0.03 to about 6. Dehydrated potatoes which do not have iodine indices within the noted range can be made suitable for preferred use in the present invention by pulverizing or finely grinding at least a part of the dehydrated potatoes in a hammermill or other suitable grinding device, e.g., to a maximum size capable of passing through a No. 50 U.S. series sieve. This ruptures some of the potato cells and thereby provides free starch which in turn increases the iodine index of the dehydrated potatoes.

To determine the iodine index of a sample of dehydrated cooked potatoes, distilled water at room temperature is added to a quantity of the dehydrated potatoes and the mixture is gently stirred for about 30 minutes in a constant temperature bath at 50° C., to completely wet the sample and hydrate the free starch. The sample is centrifuged for 10 minutes at a relative centrifugal force of about 1450 g (where g is the acceleration due to gravity) to separate the undissolved potato solids from the solution and the resulting clear starch solution is decanted through a glass wool plug to filter out any solids. The starch solution is then diluted to 10% of its initial concentration by adding distilled water. Equal volumes of diluted starch solution and a dilute $KI_3$ solution prepared in the manner described below are intimately intermixed to form a homogeneous solution. A separate solution comprising equal volumes of distilled water and the dilute $KI_3$ solution is similarly prepared and is used as a blank. The two solutions are then placed in a spectrophotometer, such as a Beckman Model B with blue phototube or equivalent, and the absorbance of the homogeneous starch solution in relation to that of the blank solution is obtained at a wavelength of 610 millimicrons using cells of 1 cm. thickness. If the absorbance is greater than 0.5 or less than 0.05 the dilution of the starch solution is adjusted by adding either additional starch solution or additional distilled water to provide an absorbance between those values. The iodine index of the sample is calculated by dividing the absorbance value so obtained by the final concentration of the starch solutions in terms of grams of initial dehydrated potato sample per liter of solution. A stock $KI_3$ solution is prepared by dissolving 3.8 grams of ACS grade KI and 2.54 grams of $I_2$ in one liter of distilled water. The stock $KI_3$ solution is then diluted for use by adding 475 milliliters of distilled water to 25 milliliters of the stock solution to form the dilute $KI_3$ solution.

Doughs based on the type of dehydrated potatoes specified immediately above can provide excellent fried products as disclosed in detail in the co-pending application of Alexander L. Liepa, entitled "Potato Chip Products and Process for Making Same," ser. No. 724,662 filed Mar. 18, 1968, commonly assigned and incorporated herein by reference. Most preferably, the doughs utilized in the present invention are the specific doughs disclosed in said co-pending application, i.e., they are prepared by intimately admixing water with dehydrated cooked potatoes to form a coherent, workable dough comprising from about 25% to about 55% water by weight, said dehydrated cooked potatoes having a reducing sugar content of from 0% to about 5% by weight and an iodine index of from about 0.01 to about 6, said dough having a lipid content defined by the following relationship: $Y = AX^{0.40}$, where Y is the lipid content of the dough in percent by weight of dehydrated potatoes, A has a value less than or equal to 2.70, and X is the dehydrated potato iodine index which ranges from about 0.01 to about 6. Although the flavor of the products which result from frying the doughs of the above-identified application is satisfactory, an improved flavor more akin to that which results when raw potato slices are fried is obtained when a plant of the Cruciferae family is added to the potatoes or incorporated in the dough, preferably prior to frying, in accordance with the present invention.

The dehydrated cooked potatoes (hereinafter "dehydrated potatoes") used in the present invention can be either in flake, granular, or powdered form (potato flour). These dehydrated potato products are made by drying cooked mashed potatoes. The flakes can be made according to a number of known processes, including those described in U.S. Patents 2,759,832, 2,780,552, and 2,787,553. The granules can also be made according to known processes, including those described in U.S. Patents 2,490,431 and 2,520,891. Potato flour is made by drum drying cooked mashed potatoes to a thin sheet which is then ground to the desired fineness.

Dehydrated potato flakes typically have a moisture content of about 7% by weight and have their potato cells substantially intact with a minimum of free starch. In addition, various stabilizers and preservatives are usually employed to improve the stability and texture of the flakes. For example, from about 150 to about 200 parts per million (p.p.m.) of sulfite is provided in the dry product. This is added to the wet mash usually as dry sodium sulfite and sodium bisulfite and protects the flakes from darkening during processing and subsequent storage. Antioxidants such as BHA (2 and 3-tert-butyl-4-hydroxyanisole) and BHT (3,5-di-tert-butyl-4-hydroxytoluene) are added in amounts up to a total of about 10 p.p.m. to prevent oxidative deterioration. Citric acid is generally added in a quantity sufficient to give about 90 p.p.m. in the dried product to prevent discoloration caused by the presence of ferrous ions. Monoglycerides such as glycerol monopalmitate or glycerol monostearate are also added to the wet mash prior to drying in amounts ranging from about 0.4% to about 1% by weight to improve the texture of the reconstituted mash.

Dehydrated potatoes in granular form have a moisture content of about 6% by weight and are composed of substantially unicellular potato particles which have their cell walls intact and which are capable of passing through about a No. 60 to about a No. 80 U.S. Series sieve. The granules also have sulfite added to reduce darkening, the amount of sulfite in the finished product usually comprising between about 200–400 p.p.m. of sulfite in the form of sodium sulfite and sodium bisulfite. Antioxidants such as BHA and BHT are added in amounts not exceeding 10 p.p.m. of both to prevent oxidative deterioration.

Potato flour is made by drying cooked mashed potatoes to a moisture level of about 6% by weight and grinding the dry product to a given particle size, generally from about 70 to about 180 microns. Unlike the dehydrated potato flakes and granules described above, however, potato flour is composed of substantially 100% ruptured potato cells.

Any of the above-described forms of dehydrated potatoes (i.e., flakes, granules, or flour), with or without the additives, can be used in practicing this invention, especially if they meet the preferred free starch content requirement. Dehydrated potatoes having a reducing sugar content between 0% and about 5.0% by weight, preferably between about 0.4% and about 2.0% by weight, are preferred when making potato-chip type products to maintain the desired light color in the fried chips since an excessive reducing sugar content adversely increases the rate of browning of the chip product. While the reducing sugar content is dependent upon that of the potatoes which were employed to prepare the dehydrated potato product, the amount of reducing sugar in the dehydrated product can be increased by adding suitable amounts of reducing sugars such as glucose, maltose lactose and the like.

Any dehydrated potatoes prepared from high quality potatoes can be used in this invention including Kennebec, Russet Burbank, Idaho Russet, and Sebago potatoes.

The lipid content of dehydrated potatoes is usually well below about 1% but it can be increased (when desired to improve the physical properties of a dough) to any level above about 1% by the addition of a suitable amount of fatty substances such as, for example, mono-, di-, and triglycerides of fatty acids, such as monopalmitin, monostearin, monolein, dipalmitin, and tripalmitin, and partial fatty esters of glycols, such as propylene glycol monostearate and monobehenate. The lipid can be added to the dehydrated potatoes or it can be added to the water. It is important, however, that the lipid be uniformly dispersed in whichever component it is mixed.

The total moisture content of the dough can range from about 25% to about 55% by weight (including the moisture content of the dehydrated potatoes), and is preferably from about 35% to about 45%, the balance of the dough comprising dehydrated potatoes (which have been rehydrated by the water) and a flavor-enhancing agent of the present invention.

In preparing the above-described doughs, the water added to rehydrate the dehydrated potato component of the mixture is preferably heated but water which is at room temperature can also be used. The water and dehydrated potatoes are uniformly mixed in, for example, a Hobart, vertical, planetary paddle mixer until the water is evenly dispersed throughout the dough and the potatoes have been uniformly rehydrated to the extent possible by the amount of water present. Heated water results in a dough which is easier to roll into thin sheets. Preferably, the dough is at a temperature of from about 80° F. to about 170° F. before it is rolled into sheets.

After the dough is prepared it can be formed into suitable shapes which can be deep-fat fried to provide the potato products of the present invention. The sizes and shapes of the products into which the dough can be formed are endlessly variable. Among the possible potato products which can be so prepared, and one in which the present invention has found particular utility, is potato chips. Thus, potato chips represent a preferred embodiment of the invention. A conventional potato chip made from a slice of raw potato can be very closely simulated by passing the dough prepared as described above between spaced mill rolls to form a sheet of dough ranging in thickness from about 0.005 inch to about 0.1 inch, and preferably to about 0.007 inch to about 0.02 inch. The dough sheet so formed can be cut into elliptical pieces having the approximate size and shape of sliced potatoes and then fried in conventional chip-frying apparatus. Alternatively, apparatus such as that described in the co-pending application of Alexander L. Liepa, entitled "Method of and Apparatus for Preparing Chip-Type Products," Ser. No. 683,083 filed Oct. 31, 1967, now abandoned, commonly assigned, can be used to produce uniformly-shaped chips.

In order to provide chips which have a surface conformation and shape similar to conventional chips made by frying thin slices of raw potatoes, it is preferred that the frying be performed with the chips constrained between a pair of closely fitting, similarly configured shaping molds which have apertures to permit the hot frying fat to come into intimate contact with the dough. The patent application last referred to describes one form of suitable shaping molds. Although the dough formulations herein described are particularly suited for preparing molded chips by constraining them during the frying operation, it is not necessary that the frying be performed with the dough in a constrained condition and satisfactory chips or other potato products can be produced by freely passing cut dough pieces through hot frying fat.

The frying operation can be carried out with the frying fat at a temperature of from about 275° F. to about 400° F. but is preferably performed at a fat temperature of from about 315° F. to about 375° F. for a time of from about 5 to about 60 seconds preferably from about 5 to about 30 seconds. Any edible cooking oil or shortening is a suitable medium for frying. The principal factor which influences the frying time is the color of the fried chip, which is primarily a function of the reducing sugar content of the dehydrated potatoes. Some of the other factors which affect chip color are the thickness of the chip, the temperature of the frying oil, and the type of oil used.

It will be apparent to those skilled in the art that various other ingredients can be included in the dough based on dehydrated potatoes and water. Emulsifiers, binders, colorants, preservativen, antioxidants, and the like can be added, as desired. For example, the other ingredients can include compounds found in commercially available dehydrated potato flakes, such as sodium sulfite or sodium bisulfite to minimize darkening, BHA and BHT to prevent oxidative deterioration, citric acid to prevent discoloration caused by the presence of ferrous ions, and mono- and diglycerides to improve texture. Glucose can optionally be added when the reducing sugar content of the dehydrated potatoes is below about 0.5% to improve the color of the fried chips.

If, instead of preparing a fried potato product from a dough, as described above, it is desired to prepare mashed potatoes from dehydrated cooked potatoes, sufficient water or milk can be added to rehydrate the potatoes to the desired consistency and form a mixture of dehydrated potatoes and water. Generally, mashed potatoes so prepared are based on from about 10% to about 30% dehydrated cooked potatoes and from about 70% to about 90% water or milk. Additionally, butter and salt can also be added for flavor purposes.

Although the flavor of products prepared as hereinabove described is generally satisfactory, it is frequently considerably inferior to the same type of product prepared in the conventional manner using raw or cooked potatoes. However, improved flavor can be obtained by adding to the dehydrated potatoes a flavor-enhancing agent selected from plants of the Cruciferae family. This family of plants is sometimes referred to be the mustard family; preferred members are mustard, horseradish, rutabaga, and radish.

The flavor-enhancing agents of the present invention can be derived directly from the plants of the Cruciferae family. In the case of horseradish, it is preferred to use the fleshy inner part of the root remaining after the brown bark is removed. This inner root is chopped or grated and can then be mixed with the potatoes to provide the improved flavor of the present invention. Alternatively, the chopped root can be dehydrated and provided in dry form as a powder and is commercially obtainable in this form.

In the case of the mustard plant, however, the flavor-enhancing agent is preferably derived from the seeds of the plant. Mustard oil is readily commercially available and results from an enzylmatic hydrolysis which occurs when the seeds are macerated in warm water. As used hereinafter the term "mustard oil" refers to this commercial material obtained from mustard seeds.

The improved flavor of the present invention can also be obtained by adding to the dehydrated potatoes the oils that are present in the roots of the Cruciferae family. The oil can be obtained by mechanically macerating the roots and expressing the oil therefrom.

Of the plants of the Cruciferae family, dried, powdered horseradish root and mustard oil represent the most preferred flavor-enhancing agents for use herein.

The flavor-enhancing agents of the present invention are preferably added to the dehydrated potatoes in the amount of from about 0.05% to about 2% by weight of the potatoes, most preferably from about 0.1% to about 1% by weight, either in solid form, e.g., as a dry powder, in wet form, e.g., as ground or macerated roots, or in oil form. When added at a level below about 0.05% by weight, the effect on the flavor of the potato products is not generally detectable; when added at a level greater than about 2% by weight, the inherent flavor of the material itself can become noticeable. Since these materials have a sharp, biting flavor and a piercing, pungent odor which is definitely not characteristic of potatoes or potato products, the addition of these materials in amounts greater than about 2% by weight is often undesirable since the inherent flavor of the materials can overshadow whatever natural potato flavor is present and provide a product different in flavor from those products prepared from fresh, raw potatoes. However, when added at a preferred level of from about 0.05% to about 2% by weight, the inherent sharp flavor of the material is not noticeable and the effect is to enhance the natural flavor of the products to provide potato products having improved potato flavor.

The flavor-enhancing agents of the present invention can be added to the dehydrated potatoes after the dehydration process or at the time the potatoes are fully or partially rehydrated, or they can be added to the potatoes during the dehydration process at the stage wherein the potatoes are in the form of a wet mash prior to the drying step. The contribution of these flavor-enhancing agents to the flavor of the potato products involves the addition of the earthy character of raw, uncooked potatoes, which is normally lost in the dehydration process and as a result weakens the flavor of the resulting dehydrated potatoes and products prepared therefrom. That these materials have the beneficial effect of improving the potato flavor products prepared from dehydrated potatoes is surprising and unexpected, particularly since the flavor of the materials themselves is not at all potato-like but rather is of a sharp, bitter biting character.

The flavor-enhancing agents of the present invention are particularly advantageous when added to dehydrated potatoes used to prepare fried potato products. Products so prepared are generally weak in the characteristic fried flavor of similar products prepared from raw potatoes and the flavor-enhancing agents of the present invention offset this deficiency when added prior to frying the products prepared from dehydrated potatoes. These flavor-enhancing agents also improve the flavor of mashed potatoes or other non-fried products prepared from dehydrated potatoes but preferred results are obtained with fried products.

Flavor-enhancing agents selected from plants of the Cruciferae family can be used alone or in combination with each other or with other compounds that also provide improved flavor, such as, for example, an ascorbic acid compound as disclosed in applicant's co-pending commonly assigned application, Ser. No. 690,389, filed Dec. 14, 1967. Although the flavor-enhancing agents of the present invention are eminently satisfactory by themselves to improve the flavor of potato products prepared from dehydrated potatoes, preferred results are obtained when they are used in combination with an ascorbic acid compound, especially in regard to fried products prepared from doughs of dehydrated potatoes and water. Suitable ascorbic acid compounds include L-ascorbic acid, D-ascorbic acid, dehydro-L-ascorbic acid, dehydro-D-ascorbic acid, and edible, water-soluble salts of the above-named ascorbic acid compounds, such as, for example, sodium L- and sodium D-ascorbate, and calcium D- and calcium L-ascorbate. The ascorbic acid compound is preferably added to the potatoes prior to frying in the amount of from about 0.02% to about 1.5% by weight. L-ascorbic acid represents a preferred ascorbic acid compound.

The following examples of the invention, while not intended to be taken as limiting the scope thereof, will serve to illustrate the compositions of, and the processes for making both mashed and fried potato products having improved flavor according to the present invention. Unless otherwise indicated in the examples, all percentages are based on weight.

The fried products which resulted from the practice of the invention according to the following Examples were taste tested by a panel of tasters who compared the products, and graded their flavor, and indicated their preference with respect to the products to which a flavor-enhancing agent of the present invention has been added as compared with the same product prepared in the same manner but without such an added flavor-enhancing agent. The flavor scale used ranged from grades of 1 to 10 and is as follows:

10—very strong potato flavor
8—strong potato flavor
6—moderate potato flavor
4—weak potato flavor
1—no potato flavor As a fram of reference, commercially available potato chips prepared by deep-fat frying slices of raw potatoes can have an average flavor grade of about 7 and can range in flavor grade from about 4 to about 8.

Example I 308 grams of dehydrated cooked potato flakes having an average reducing sugar content of about 0.8% are pulverized in a hammermill to provide pulverized flakes with ruptured cells and with the particles having a maximum size capable of passing through a No. 50 U.S. Series Sieve. The pulverized flakes have an iodine index of about 0.04. The flakes contain 8.3% water, 1.1% lipid, and a total of about 0.2% of sodium acid pyrophosphate, sodium bisulfite, BHA, and BHT.

1.3 grams of lipid in the form of commercially available mono-, di-, and triglycerides are added to 192 grams of boiling water in a suitable vessel. The mono-, di-, and triglycerides are prepared by superglycerinating soybean oil to obtain a mixture of mono-, di-, and triglycerides comprising about 40% monoglycerides, about 40% diglycerides, and about 20% triglycerides, and having an iodine value of 65. The lipid is permitted to melt in the boiling water and 1.0 gram of dried, powdered horseradish is added to the water, after which the mixture is agitated by hand stirring for about one minute to completely disperse the added materials. The water solution thus contains 0.67% lipid by weight and 0.52% horseradish by weight.

The pulverized flakes are intimately intermixed with the above-prepared boiling water solution in a Hobart Model C-100 vertical, planetary, paddle mixer by slowly adding the water solution to the pulverized dehydrated potatoes to provide a dough having a total moisture content of 43.1% which includes both the added water and the water present in the flakes. The combination is intimately blended at a mixer speed of 69 rpm for 4 minutes to completely rehydrate the potatoes and form a workable dough. The total lipid content of the dough is 0.94% and the amount of horseradish added is 0.20%, based on the total weight of the dough. The amount of horseradish based on the weight of potatoes is 0.3%.

The dough is at a temperature of about 115° F. and is passed between the rolls of a two-roll mill to provide a coherent, easy-to-handle dough sheet which has a thickness of 0.015 inch. The dough is immediately cut into substantially elliptical pieces which have a major diameter of about 3.0 inches and a minor diameter of about 2.0 inches and the pieces are then deep-fat fried for 15 seconds in a cottonseed-based frying oil which is maintained at a temperature of 350° F. The resulting fried product is a tasty, crisp, chip-type food product which is then salted uniformly over one surface to provide a chip having 2% salt.

The taste, texture, color, eating quality and appearance of the potato chip product prepared according to this example closely resembles that of conventional potato chips made by frying sliced raw potatoes. When compared with a control product prepared by the same process and including the same ingredients as indicated above but without the addition of horseradish, the example chip with the added horseradish has a better potato chip flavor than the control chip.

In Examples II, III, IV, and V, potato chips were prepared using dehydrated potatoes having the same analysis as those of Example I and following the process described in Example I. The dough compositions and flavor evaluations were as shown in the table below. These compositions included, as an added ingredient, L-ascorbic acid in the amounts indicated. The ascorbic acid was added to the boiling water together with the lipid and horseradish. The flavor evaluation was based on a comparison by five people of the flavor of Example chips with that of control chips prepared by the same process and having the same ingredients including L-ascorbic acid, but without the addition of horseradish.

| | Dough composition, percent | | | | | Flavor evaluation, average flavor grade— | |
|---|---|---|---|---|---|---|---|
| | Dried powdered horseradish | L-ascorbic acid added | Dehydrated potatoes | Water added | Lipid added | Example chip (containing horseradish) | Control chip (no horseradish) |
| Example: | | | | | | | |
| II | 0.2 | 0.4 | 61.0 | 38.1 | 0.3 | 7.1 | 5.9 |
| III | 0.4 | 0.4 | 60.9 | 38.0 | 0.3 | 7.6 | 5.9 |
| IV | 0.6 | 0.4 | 60.8 | 37.9 | 0.3 | 7.2 | 5.9 |
| V | 0.8 | 0.4 | 60.7 | 37.8 | 0.3 | 6.9 | 5.9 |

When dried, powdered rutabaga and dried, powdered radish is substituted for the dried, powdered horseradish in the above examples, substantially similar results are obtained in that the resulting potato chips so prepared closely resemble conventional potato chips in appearance, texture and taste and are preferred over control chips prepared without the added dried, powdered rutabaga or radish.

Example VI

The procedure described in Example I was repeated using 308 grams of the dehydrated potatoes, 192 grams of boiling water, 2 grams of mustard oil, and 2 grams of L-ascorbic acid. (The amount of mustard oil added, based on the weight of the potatoes, was 0.65%.) The resulting fried chips had a taste very similar to that of potato chips prepared by deep fat frying slices of raw potatoes. 5 of 6 flavor panelists who tested these examples chips along with control chips to which the mustard oil had not been added preferred the flavor of the example chips containing added mustard oil.

Example VII 120 grams of fresh whole milk, 15 grams of butter, 2.3 grams of salt, and 0.3 gram of dried powdered horeradish were placed in a mixing bowl and 360 grams of boiling water were added. The mixture was hand stirred for 1 minute to completely disperse the ingredients in the water. 93 grams of dehydrated potato flakes were added to the mixture and intimately and gently mixed therewith in a Hobart mixer for one minute at low speed until the potato flakes had become uniformly rehydrated to provide mashed potatoes of a uniform consistency. The mixture was at a temperature of about 140° F.

The mashed potatoes so prepared were compared with hot mashed potatoes prepared by mashing 465 grams of freshly boiled U.S. No. 1 Idaho potatoes and adding thereto 120 grams of fresh whole milk, 15 grams of butter, and 2.3 grams of salt and intimately admixing the combination to provide a uniform consistency. When the mashed potatoes prepared by rehydrating dehydrated potato flakes together with added horseradish was compared with the mashed potatoes prepared from freshly boiled potatoes, a taste panel of four members judged the former product that included horseradish to be at least equal in flavor to the latter product (freshly prepared mashed potatoes). Mashed potatoes prepared from dehydrated potatoes and without flavor additives have a lower flavor level than those mashed potatoes prepared from freshly boiled potatoes and thus the added horseradish improves the flavor of such dehydrated potato products.

Example VIII

The process of Example VII was repeated except that 435 grams of water, 2.6 grams of salt, 0.4 gram of dried powdered horseradish and 93 grams of dehydrated potatoes were employed to provide a rehydrated mashed potato mixture. This product was compared with the freshly mashed boiled potatoes of Example VII and was judged to be superior to the latter by the four members of a taste panel by whom the samples were tasted and compared.

Although the primary purpose in adding a flavor enhancing agent in accordance with the present invention is to optimize the potato flavor of the product, there are inherent advantages in the process. For example, addition of the flavor-enhancing agent of the present invention increases the tolerance of the product to raw potato quality, dehydrated potato quality, and potato reducing sugar content. More specifically, the dehydrated potatoes which have been heretofore employed to prepare doughs from which fried potato products were subsequently prepared were generally of a high quality so that the final product would have a desirable potatolike taste. This required either that the best potatoes be employed or that particular efforts be taken during the course of dehydration to assure the least damage to the potatoes and thereby not adversely affect the flavor. Each of these approaches increased the cost of such products since it narrowed the available range of potatoes which could be used. However, when a flavor enhancing agent of the present invention is added as hereinabove described, the resulting products have an improved potato-like flavor and therefore either lower quality potatoes can be used or less costly procedures can be employed in their dehydration.

Another factor which can affect the flavor of fried products prepared from dehydrated potatoes and water is the amount of reducing sugar present in the potatoes. The reducing sugars combine with the amino acids present in potatoes to cause the browning reactions which are so characteristic of fried potato products. The more reducing sugar present, the darker will be the color for a given frying time and temperature. Thus, the amount of sugar present in the dehydrated potatoes also becomes a limiting factor affecting their suitability for use in fried potato products since the higher the reducing sugar content, the quicker the product will brown and therefore less time will be available for the characteristic fried flavors to develop. However, when one of the flavor enhancers of the present invention is added, the flavor is improved to the extent that the product can be fried for a shorter period of time and therefore potatoes having a higher reducing sugar content can satisfactorily be employed. If potatoes having a low reducing sugar content are employed, the color of the fried product will be very light. To provide chips having a darker color, glucose can be added to increase the total reducing sugar content to the desired level for proper color.

All percentages, parts and ratios herein are by weight unless otherwise specified.

What is claimed is:

1. A process for improving the flavor of potato products prepared from dehydrated potatoes which comprises adding to the potatoes a flavor-enhancing agent selected from the group consisting of mustard horseradish, rutabaga and radish said flavor-enhancing is added to said potatoes in an amount from about 0.05% to about 2% by weight without itself becoming noticeable.

2. The process of claim 1 wherein the potato product is prepared from a mixture of dehydrated potatoes and water.

3. The process of claim 2 wherein the flavor-enhancing agent is added to the potatoes and then an additional step comprises cooking the mixture.

4. The process of claim 3 wherein said mixture is cohesive dough having about 25% to about 55% water by weight prepared from pulverized potato flakes.

5. The process of claim 4 wherein the cooking step comprises frying said mixture at a temperature of from about 275° F. to about 400° F. for a time period of from about 5 to about 60 seconds.

6. The process of claim 5 wherein the flavor-enhanceing agent is dried powdered horseradish root or mustard oil.

7. The proces of claim 6 including the additional step of adding an ascorbic acid compound to the potatoes prior to frying in the amount of from about 0.02% to about 1.5% by weight.

8. The process of claim 7 wherein the ascorbic acid compound is L-ascorbic acid.

References Cited

UNITED STATES PATENTS

| 3,027,264 | 3/1962 | Icmiter | 99—207 |
| 3,259,503 | 7/1966 | Tan | 99—100 |
| 3,396,036 | 8/1968 | Liepa | 99—100 |
| 3,063,849 | 11/1962 | Nelson | 99—207 |
| 2,760,869 | 8/1956 | Yanick | 99—140 |

OTHER REFERENCES

Modern Incyclopedia of Cooking; Meta Given; Ferguson & Associates; Chicago; 1949; pp. 1244 and 1323.

The Good Housekeeping Cookbook; Reinhart & Co.; New York; 1949; pp: 534, 540, 541.

Incyclopedia of Chem. Tech.; vol. 2; p. 747.

NORMAN YUDKOFF, Primary Examiner

M. G. MULLEN, Assistant Examiner

U.S. Cl. X.R.

99—207, 140

PO-1050
(5/69)

UNITED STATES PATENT OFFICE
CERTIFICATE OF CORRECTION

Patent No. 3,594,187　　　　　　Dated　July 20, 1971

Inventor(s)　Alexander L. Liepa

It is certified that error appears in the above-identified patent and that said Letters Patent are hereby corrected as shown below:

Col. 2, line 11 - "DESCRIPTION OF THE PREFERRED" should be -- DESCRIPTION OF THE PREFERRED EMBODIMENTS --

Col. 4, line 55　insert a comma after "maltose"

Col. 4, line 66　"monolein" should be -- monoolein --

Col. 5, line 6　insert a comma after "heated"

Col. 5, line 58　insert a comma after "seconds"

Col. 5, line 70　"preservativen" should be -- preservatives --

Col. 6, line 39　"enzylmatic" should be -- enzymatic --

Col. 7, line 13　after "flavor" insert -- of --

Col. 7, line 16　insert a comma after "bitter"

Col. 7, line 74　"fram" should be -- frame --

Col. 8, line 36　"69" should be -- 60 --

Col. 8, line 41　"0.3%" should be -- 0.32% --

Col. 11, line 5　"enhanceing" should be -- enhancing --

Col. 11, line 7　"proces" should be -- process --

Signed and sealed this 15th day of February 1972.

(SEAL)
Attest:

EDWARD M. FLETCHER, JR.
Attesting Officer

ROBERT GOTTSCHALK
Commissioner of Patents